E. WACHTEL.
FLYING MACHINE.
APPLICATION FILED JAN. 17, 1911.
1,115,041.
Patented Oct. 27, 1914.
2 SHEETS—SHEET 1.
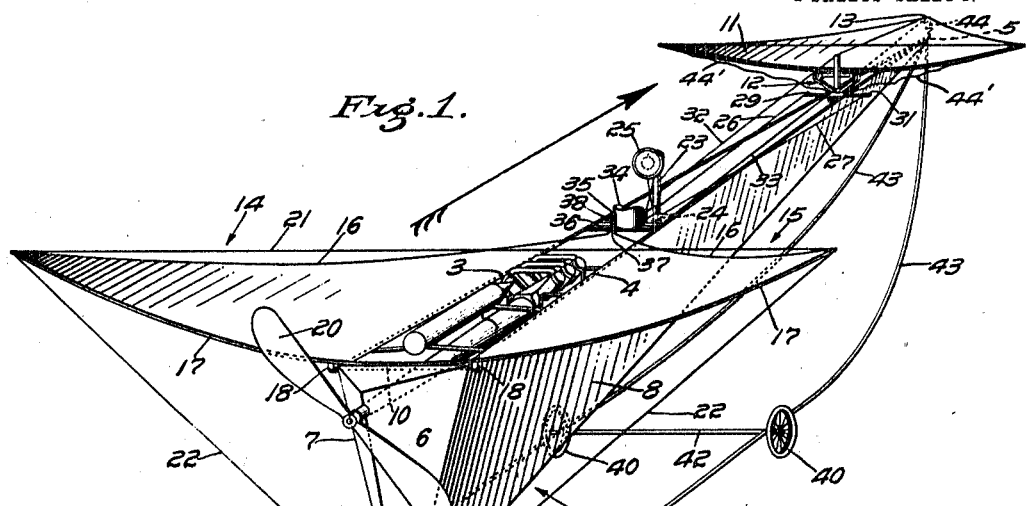
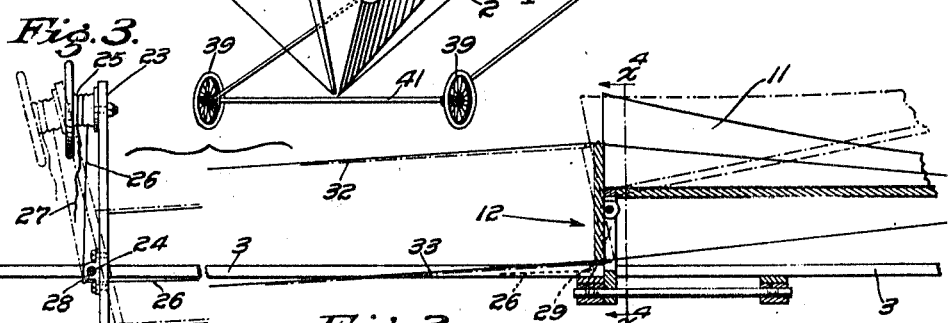
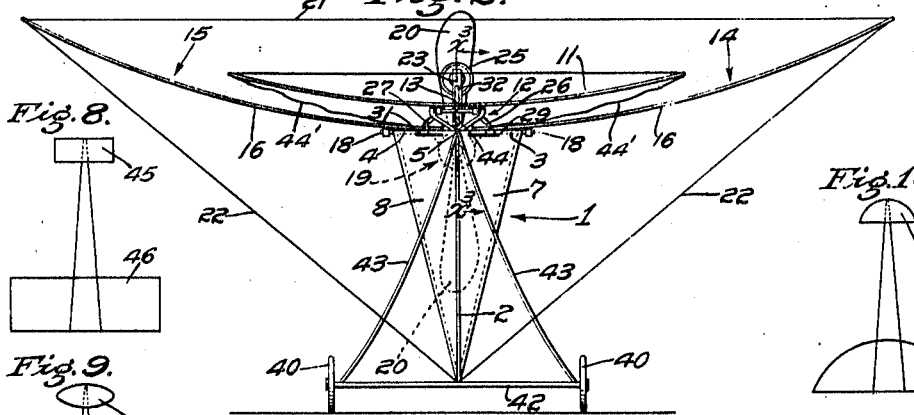
Inventor:
Elmer Wachtel
by
James R. Townsend
his atty
Witnesses:

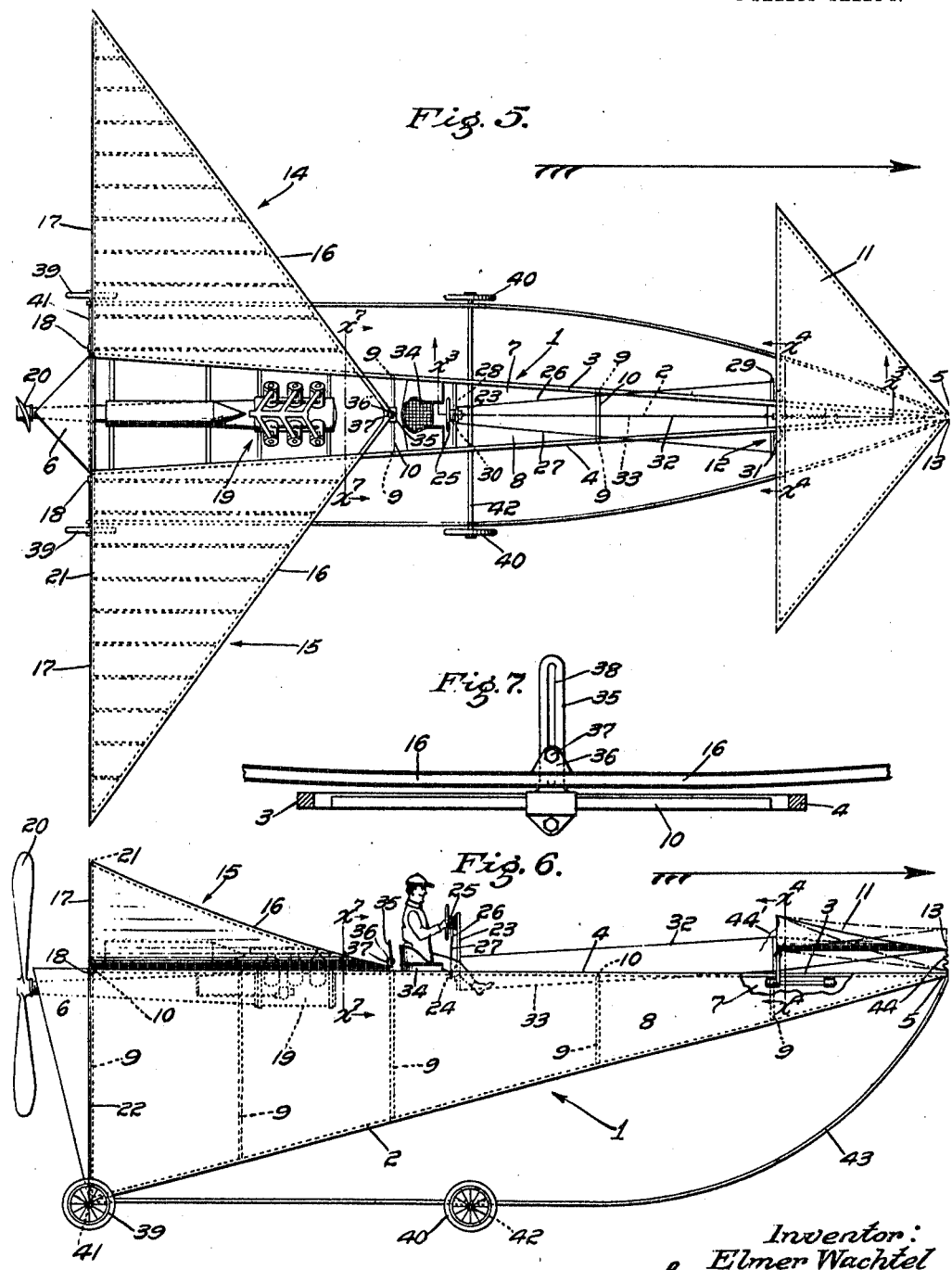

UNITED STATES PATENT OFFICE.

ELMER WACHTEL, OF LOS ANGELES, CALIFORNIA.

FLYING-MACHINE.

1,115,041.   Specification of Letters Patent.   Patented Oct. 27, 1914.

Application filed January 17, 1911. Serial No. 603,187.

*To all whom it may concern:*

Be it known that I, ELMER WACHTEL, a citizen of the United States, residing at Los Angeles, in the county of Los Angeles and State of California, have invented a new and useful Flying-Machine, of which the following is a specification.

Some of the forces involved in the operation of a flying machine are the inertia of the air, the force of gravity and the momentum of the machine; and an object of this invention is to so dispose the surfaces and the load of the machine that the tendency of these forces will always be to maintain the machine upright while in flight.

Objects of the invention are: stability of the machine while flying in the air; automatic lateral balance without ailerons or wing warps; ease of guidance; strength and simplicity of construction; automatic righting; and superior buoyancy during flight.

A further object is to so construct the machine that the forces involved during flight through the air will all tend to assist in maintaining the machine in the air and in equilibrium right side up.

In carrying out this invention the machine is so constructed that it will float as a boat in water as well as in the air.

Further objects and advantages may appear from the subjoined detail description.

A principle of this invention is that its structural features are of a triangular character, thus conserving strength, stability, high speed and buoyancy.

Another principle is that the surfaces are arranged to penetrate the air with the least resistance and to act upon the air so as to tend to produce above the machine surfaces a vacuum so that the air pressure from below will be highly efficient to support the machine; and said surfaces are so shaped and disposed as to act upon the air in such a manner as to produce minimum displacement thereof as the machine proceeds forward.

The accompanying drawings illustrate the invention.

Figure 1 is a perspective view of a flying machine constructed in accordance with this invention. Fig. 2 is a front elevation of the machine. Fig. 3 is an enlarged detail of the steering, elevating and descending mechanism shown in vertical axial section on line $x^3$, Figs. 2, 4 and 5. Fig. 4 is an enlarged cross section on line $x^4$, Figs. 1, 3, 5 and 6. Fig. 5 is a plan of the machine. Fig. 6 is a side elevation. Fig. 7 is an enlarged fragmental vertical transverse sectional detail on line $x^7$, Figs. 5 and 6, of the adjusting means for the rear wing. Figs. 8, 9 and 10 are diagrammatic plans to indicate various forms of wings I have employed with the prone pyramidal body and which may be substituted for the preferred form of wings shown in the other views.

In the several views solid lines indicate positions of the parts for straight level flight and in some of the views dotted lines indicate positions of parts for deflected flight. The small arrows on the lines of cross section indicate the direction of sight and large arrows in some of the views indicate the direction of flight.

The body 1 is a prone elongate triangular pyramid, the same being triangular in vertical cross section at any point and is provided with a central keel 2 and two side top rails 3, 4, all three of which diverge from the point or tip 5 to the stern 6, the top rails 3, 4, being divergent from each other in one plane, which is regarded as a horizontal plane and the keel diverging from said horizontal plane at a greater angle than the divergence of the top rails; so that the form of any normal cross-section of the body is an inverted isosceles triangle and the body is practically a prone elongate triangular pyramid having its apex at the front. The side walls 7, 8, extend from the top rails to the keel and from the prow or tip to the stern; each of said walls being triangular and united with the stern walls 6, thus to form a shell which will sustain a load in water. The top rails and keel are connected by any required number of triangular frames composed of upwardly divergent ribs 9 of equal length and a shorter horizontal top bar 10. It is understood that any form of bracing to strengthen the structure that may be deemed advisable by the constructor may be supplied to stiffen the frame formed by the keel and top bars; but as this is no part of the present invention illustration of any body bracings other than the transverse frames is deemed unnecessary. At the front end or tip of the body the front elevating, descending and steering wing 11 is mounted, the same consisting of a triangular leaf, the front tip of which is practically at the tip of the body 1 and the rear edge of which is normally parallel with the plane of the top bars and normal to the longitudinal axis of the body. The front wing is mounted to rock and to tilt, being capable of deflection from said parallelism to guide the machine laterally, and capable of tilting to raise and lower the machine. The front wing is preferably a curved leaf in the form of an isosceles triangle having relatively short equal rearwardly diverging front edges, the long rear edge being practically normal to the axis of the body and bowed upwardly to the tips from the middle; the traces of curvature of the wing being in vertical planes that are parallel with the rear edge. That is to say, the wing may be regarded as a triangular segment of a cylindrical surface; the rear edge of the wing being in a plane normal to the axis of the cylinder. The rear edge of the front wing is rigid and is mounted by a universal joint 12 on the body frame 1, and the tip 13 of said front wing is movable up and down on the axis of said rear edge. The rear wing is larger than but is of the same general form as the front wing and is preferably formed with two limbs 14, 15, that are scalene triangles, the front edges 16 thereof extending back at acute angles with the top bars 3, 4, to the rear wing bar 17 which is normal to the axis of the body and extends across the top bars at right angles to the keel. Said stern wing bar is journaled at 18 upon the ends of the stern top bar 10. The engine 19 will be appropriately located at the stern where found advisable in order to bring the center of gravity of the machine into right relation with the supporting planes or wings and the propeller 20 is mounted behind the stern.

The proportions of the several parts may be varied within the judgment of the constructor. The front wing is of comparatively small area, being one-third, more or less, the area of the rear wing. The side walls broaden rearwardly and slant inwardly and from the horizontal plane of the machine in which the wings practically lie, to a considerable distance below said horizontal plane at the rear of the machine as clearly shown in Fig. 6, so that as the machine speeds forward, the air which is moved by the forward portions of said walls, will be above the plane of the air which will contact with rearward lower portions of the side walls and the constant tendency of the body as it proceeds forward is to contact new air and force the air laterally from the vertical axial plane of the body, thus producing on both sides of said body a condensation of air which reaches the maximum at the rear of the machine and top of the body. Any advance, ascent or descent of the body through the air will cause the top bars of said body to pass onward or downward through the air thus condensed and the spill of the air past the side bars will tend to form a vacuum above the body, thus assisting in buoying the body.

The spill is more and more condensed as the rear part of the body is approached and the most highly condensed spill comes into contact with the undersides of the two limbs of the stern wing and said wing therefore rides on such condensed air. The spill is most highly condensed at the rear edge of said rear wing and near the body and there the air has comparatively great inertia and affords a superior medium for the propeller to act upon to drive the machine forward. There may be a continual spill along the oblique front edges of said wing, thus tending to form a vacuum above said wing from the front edges rearwardly. A final spill of condensed air occurs at the rear edge of the stern wing, which tends to form a vacuum above said wing and body. The spill of air from the machine thus greatly assists in maintaining the buoyancy of the body.

In order to increase the spill at the tips of the stern wing, said wing is deflected upwardly and outwardly in a curve from the body to the side tips. The rear edge of each of the wings is thus up-curved from the body to the side tips for the purpose of balancing the machine by reducing the air resistance as the leverage increases. The upward curvature of the wings causes the air passing therebeneath to spread outward and spill uniformly from along the rear edges of the wings. The curved rear bar is stayed by a line 21 connecting the tips together and by guys 22 connected with the keel.

The tiller 23 may be arranged near the front apex of the rear wing and comprises an upright which is jointed at 24 to the frame of the body and provided with a wheel 25 around which is wound in opposite directions the tiller ropes 26, 27; the rope 26 on one side of the wheel being led past pulleys 28, 29, and connected with the universal joint 12 of the front wing to deflect the wing downward on the left side while the other tiller rope is paid out by the wheel; said other tiller rope being led past the pulleys 30, 31, connected with the other side of the universal joint of the front wing to lower it when the wheel is turned in the opposite direction. The elevator ropes 32, 33, are led from the top and bottom of the upright and are connected to move the apex of the front wing up and down for the purpose of ascending and descending. The aviator's seat 34 is located immediately behind the tiller 23 between and on a level with the top rails 3 and 4. For the purpose of adjusting the rear wing a slotted standard 35 may be clamped to the cross-bar 10 to which a lip 36 at the intersection of the front edges 16 of the stern wing is adjustably secured by means of a bolt 37 passing through the slot 38 of the standard. The stern wing may thereby be adjusted to its most efficient sustaining position with relation to the load by turning it about the journal 18 and then securing with the bolt 37.

The ground wheels 39, 40, are carried by axles 41, 42, connected with the body to support the same when at rest; and runners 43 are also provided, the same extending from the stern to the tip of the body and being connected with the axles of the running wheels and converging upwardly and bowed from the front axle to the tip, so that upon descent at a sharp angle the runners may first engage the ground. Stays 44 and 44' between the front tip of the front wing and the tip of the body and between the side tips of the wing and the sides of the body serve to prevent too great deflection of the front wing in case of accident to the steering apparatus.

In case of breakage whereby the front wing is left free from control of the tiller, the descent of the machine will cause an upward deflection of the tip of the front wing; and consequently an upward deflection of the tip of the machine as the machine descends. By reason of the lesser size of the front wing and the greater spill from the rear of the machine the tendency to a vacuum above the machine causes the machine to right itself even though the propelling force is *nil* and the descent tends to be vertical.

In making a turn to right or left the undermost broad-side of the body banks against the air and the spill from such broad-side is effective against the undermost limb of the rear wing as the machine tilts in making the turn and the inertia of the air is thus effective against the under surfaces of the undermost side of the body and the undermost limb of the rear wing; and the tendency to a vacuum occurs on the upper side of the body, thus tending to support the machine and prevent it from turning over in making a lateral turn. In case of any displacement of load tending to cause the machine to capsize, the undermost broad-side of the body and the undermost limb of the rear wing are brought into position to sustain the load. By reason of the retreating front edges of the rear wing and the up curve of the limbs of said wing from the body, the spill of the air during vertical descent tends to maintain the body in upright position.

The stern walls 6 are preferably pyramidal; tapering from top to bottom and joining each other at the vertical axial plane of the body, and the propeller is preferably mounted at the upper portion of the stern so as to act upon the condensed air as it spills from the machine.

I have shown the machine in the form I at present deem most advisable, but it is understood that numerous changes may be made in the form and arrangement of parts without departing from the broad principle of the invention.

In Fig. 8 the wings 45, 46 are rectangular, in Fig. 9 the wings 47, 48 are practically oval, and in Fig. 10 the wings 49, 50 are practically semi-circular.

I have employed pyramidal bodies of different shape but deem the form shown in which the top side of the cross-section is practically one-half the vertical of such cross-section to serve the best.

It is understood that the surfaces of the wing and the sides of the body may be of any suitable water-proof material that is smooth and practically impervious to air. By the triangular construction of the body and the wings, great strength of bracing is secured. The front and rear edges 16 and 17 of the wings are formed of rigid bars that are fixed together at their ends and mutually brace each other against change in the form of the wings.

The tiller wheel 25 being mounted on the upright 23 that is jointed by a universal joint on the frame of the body affords unitary means to operate the connections to control the front wing in both its rocking and tilting movements; and by reason of the arrangement of the connections between the tiller and the front wing, the machine during flights, will move in the direction toward which the tiller wheel is moved.

The machine as shown has wings at the apex and stern only of the prone pyramidal body, there being a long open spill space between the front and rear triangular wings so that the supporting, guiding and raising and lowering effects of the wings are maximized and may be made to coöperate or to work in opposition in the most effective way as required.

I claim:—

1. A flying machine comprising a prone pyramidal body, a propeller mounted at the upper portion of the larger end of said body, a triangularly formed rudder wing mounted on the upper side of the body at the front thereof, and a second triangularly formed wing mounted on the top of said body at the rear thereof and adjacent said propeller, said wings having apices pointing toward the small end of said pyramidal body and sides deflected in an upward direction from said pyramidal body toward the tips of the wings substantially as and for the purpose set forth.

2. In a flying machine, the combination with a prone pyramidal body, of a triangularly-formed rudder wing mounted on the upper side of said body at the front thereof, and a second triangularly-formed wing mounted on the upper side of said body at the rear thereof, said wings having apices pointing toward the small end of said pyramidal body and sides deflected in an upward direction from said pyramidal body toward the tips of the wings substantially as and for the purpose set forth.

3. In a flying machine having a pyramidal body, the combination of a triangular rudder wing mounted at the top of said body to rock and tilt, a steering shaft adapted to tilt, a steering wheel fixed on said shaft, flexible members connecting said steering wheel to the lateral tips of said wing to rock said wing when said wheel is rotated, and second flexible members connecting said steering shaft to the front tip of said wing to tilt said wing when said shaft is tilted.

4. In a flying machine comprising a pyramidal body, a triangular-formed rudder wing mounted on the upper side of the top of said body and bowed upward from the body toward its lateral tips, a larger triangular-formed wing pivoted at the upper side of the stern of said body and bowed upward from the body toward its lateral tips, and a guide mounted near the seat of the driver, having its front tip slidably mounted in said guide and adapted to be secured at different points in said guide.

5. In a flying machine, the combination with a pyramidal body, of a triangularly-formed wing pivoted at its rear end to the upper side of the stern of said body and bowed upward from the body toward its lateral tips, and a guide mounted near the seat of the driver, said wing having its front tip slidably mounted in said guide and adapted to be secured at different points in said guide.

6. In a flying machine the combination with a pyramidal body, of a triangular rudder wing pivotally mounted at the top of said body to rock and tilt, steering means to rock and tilt said rudder wing, a pair of pulleys mounted substantially at the point of pivot of said rudder wing, guide portions above and below the point of pivot of said rudder wing, flexible members connected at one end to the lateral tips of said wing, passing around said pulleys and connected at their other end to the steering means whereby the wing may be rocked, and second flexible members connected at one end to the front tip of said wing, passing around said guide portions and connected at their other end to the steering means whereby the wing may be tilted.

In testimony whereof, I have hereunto set my hand at Los Angeles California this 6th day of January, 1911.

ELMER WACHTEL.

In presence of—
 JAMES R. TOWNSEND,
 L. BELLE RICE.